May 14, 1929. W. J. HORTON 1,712,702
CULTIVATING ATTACHMENT
Filed Feb. 14, 1927
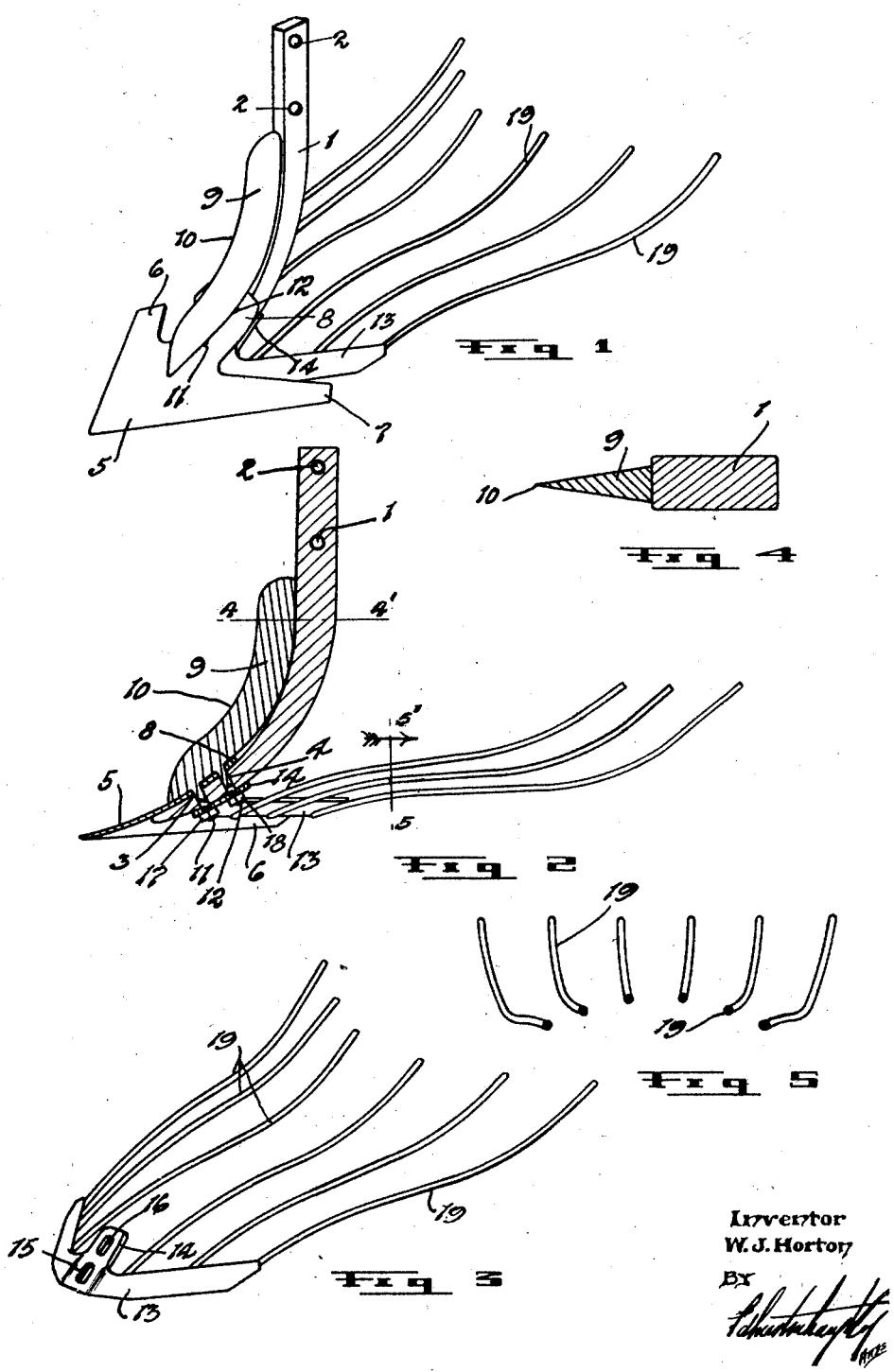
Inventor
W. J. Horton Patented May 14, 1929.

1,712,702

UNITED STATES PATENT OFFICE.

WILLIAM J. HORTON, OF WINNIPEG, MANITOBA, CANADA.

CULTIVATING ATTACHMENT.

Application filed February 14, 1927, Serial No. 168,106, and in Canada January 7, 1927.

The invention relates to improvements in cultivating attachments and an object of the invention is to provide an attachment to the shank of a cultivator which will co-operate with the cultivator point and thoroughly and efficiently cultivate the ground and will eradicate the weeds bringing them to the surface of the soil where they are exposed to the weather and sun.

A further object of the invention is to provide a device which can be attached to an existing cultivator shank without requiring any alteration to the existing structure, and which is designed so it can be attached to the shank quickly and without requiring the removal of existing working parts.

A further and more specific object is to provide a coulter attachable to the shank for cutting the soil and clinging weeds and a plurality of connected specially shaped trailing fingers also attachable to the shank and operating to separate the weeds and soil and leave the weeds lying on the soil surface, the coulter and fingers being fastened to the shank by bolts common to both.

With the above more important objects in view the invention consists essentially in the arrangement and construction of parts hereinafter more particularly described, reference being had to the accompanying drawing, in which:

Fig. 1 is a perspective view of the complete device.

Fig. 2 is a vertical sectional view centrally and longitudinally through the complete device.

Fig. 3 is a perspective view of the trailing fingers and the V-shaped plate carrying the same.

Fig. 4 is an enlarged detailed vertical sectional view at 4—4', Figure 2.

Fig. 5 is a vertical cross sectional view at 5—5', Figure 2, and looking in the direction of the applied arrow.

In the drawing like characters of reference indicate corresponding parts in the several figures.

Cultivating machines at the present time customarily present shanks which carry points of various types, the points being connected to the lower ends of the shanks by fastening bolts. I have found by observation that the holes in the shanks which receive the fastening bolts are the same distance apart in practically all types of machines. In the present drawing I have shown a shank 1 of the usual type, the upper end of which is provided with bolt holes 2 for fastening to the machine drag bars (not shown), whilst the lower curving and gradually pointing end thereof is provided with a pair of spaced bolt holes 3 and 4. The customary V-shaped crow foot, shovel or point 5 is as shown, this presenting diverging side wings 6 and 7, and a central extension 8 which overlies the lower end of the shank and is provided with bolt holes registering with those 3 and 4 in the shank. Customarily the point is connected to the shank by removable bolts passing through these registering bolt holes.

Where my invention, however, is employed I remove the bolts and in their place substitute therefor studs or bolts carried by my coulter. The coulter 9 is in the form of a bar bent to conform to the curvature of the lower end of the shank and having the front edge thereof sharpened as indicated at 10. The lower end of the coulter overlies the extension 8 and it has the lower extremity thereof tapering to merge gradually with the point 5. The lower end of the coulter is provided on the rear side with threaded studs or bolts 11 and 12 spaced apart a distance so that they will enter the customary registering openings in the extension 8, and the lower end of the shank, when the customary bolts previously referred to have been removed.

I also provide a winged plate 13 having a central extension 14, the plate conforming more or less to the general shape of the point 5. The extension 14 is provided with a pair of slots 15 and 16 and the winged plate is fastened to the underside of the lower end of the shank by passing the studs 11 and 12 through the slots and then tightening up the nuts 17 and 18 which are adapted to screw thread onto the lower ends of the studs. To the wings of the plate 13, I permanently secure the forward ends of the fingers 19, the said forward ends of the fingers underlying the wings of the plate and being fastened thereto, as by welding. The fingers have their forward ends suitably spaced and the central fingers are parallel, whilst the others diverge rearwardly. Each finger is bent into an ogee shape to give a forward rising curve, a rearward depression and a final upcurving tail end. The curvature of the central fingers is greater than that of the adjacent outer fingers, and the curvature of the outermost fingers is least of all. The result of this is, that rearwardly of the winged plate the fingers lie approximately in the arch of a transverse circle, the central fingers being highest, (see Figure 5). I might mention also that the fingers gradually increase in length the inner pair being the shortest and the outer the longest.

When it is desired to provide my attachment on an existing cultivator shank, it is only necessary to remove the customary bolts which fasten the cultivator shank to the point. This being done, one then passes the studs 11 and 12 through the registering bolt openings in the extension 8 and the shank and through the slots 15 and 16 and then applies and tightens up the nuts 17 and 18. With this attachment on a cultivator one can efficiently cultivate the soil and can eradicate weeds. The coulter cuts the soil and weeds and by so doing prevents the weeds from accumulating on the shank as customarily occurs where no such coulter is provided. The trailing fingers separate the weeds from the soil and pass the weeds upwardly through the soil to the surface where they are left exposed to the sun and weather. It will be observed the peculiar shape of the fingers gradually lifts the weeds whilst permitting the earth to pass through and they also act to pulverize the soil thereby leaving a good seed bed.

As the holes in the shank and point on practically all cultivators are the same distance apart my device can readily be attached to the various types of machines, and obviously it is not necessary, in any way to change the existing structure of the cultivator.

I might point out also that the winged plate 13 has the wings thereof designed so that they are parallel to the planes containing the wings of the point and accordingly they offer no obstruction to the soil.

What I claim as my invention is:—

1. The combination with a cultivator shank and a winged point located at the lower end of the shank, of a vertically disposed sharpened coulter located in advance of the shank and overlying the point, a winged plate to the rear of the point and underlying the lower end of the shank, spaced trailing fingers having their forward ends permanently attached to the plate and bolts carried by the coulter and passing through the point, shank and plate, and detachably fastening said parts together.

2. The combination with a cultivator shank and a winged point, the point and shank being provided with registering openings of an upstanding coulter located in advance of the lower end of the shank and extending centrally in advance of the front part of the point, said coulter being provided with bolts passing through the registering openings of the point and shank, and a winged plate underlying the shank and to the rear of the point and fastened to the shank by the aforesaid bolts, and a plurality of spaced trailing fingers secured to the plate wings.

3. The combination with a cultivator shank and a winged point located at the lower end of the shank, of a vertically disposed sharpened coulter located in advance of the shank and overlying the point, a winged plate to the rear of the point and underlying the lower end of the shank, spaced trailing fingers having their forward ends permanently attached to the plate and fastening means carried by the coulter and passing through the point, shank and plate, and detachably fastening said parts together.

Signed at Winnipeg, this 7th day of January, 1927.

WILLIAM J. HORTON.